United States Patent [19]
Lin

[11] Patent Number: 5,036,025
[45] Date of Patent: Jul. 30, 1991

[54] INFRARED ABSORBING GREEN GLASS

[75] Inventor: Yeong Lin, Sunnyvale, Calif.

[73] Assignee: Hoya Optics Inc., Fremont, Calif.

[21] Appl. No.: 591,638

[22] Filed: Oct. 2, 1990

[51] Int. Cl.$^5$ ............................. C03C 4/08; C03C 4/10
[52] U.S. Cl. ......................................... 501/48; 501/73; 501/904
[58] Field of Search ........................... 501/48, 73, 904

[56] References Cited

U.S. PATENT DOCUMENTS

| | | | |
|---|---|---|---|
| 3,923,527 | 12/1975 | Matsuura et al. | 501/48 |
| 3,960,754 | 6/1976 | Woodcock | 428/428 |
| 3,979,322 | 9/1976 | Alexeev et al. | 501/48 |
| 4,075,120 | 2/1978 | Myers et al. | 501/48 |
| 4,105,577 | 8/1978 | Yamashita | 501/48 |
| 4,106,857 | 8/1978 | Snitzer | 350/311 |
| 4,110,245 | 8/1978 | Yamashita | 501/48 |
| 4,303,298 | 12/1981 | Yamashita | 501/45 |
| 4,615,989 | 10/1986 | Ritze | 501/48 |
| 4,920,081 | 4/1990 | Beall et al. | 501/48 |
| 4,962,067 | 10/1990 | Myers | 501/45 |

Primary Examiner—Mark L. Bell
Attorney, Agent, or Firm—Sughrue, Mion, Zinn, Macpeak & Seas

[57] ABSTRACT

A green optical filter phosphate-based glass having a high near infrared, absorption at about 650 nm to 950 nm and a transmission peak transmission at 550 nm to 560 nm and with the steepest slope of the absorption curve occurring between about 570 nm to 650 nm. The glass composition comprising, in mol %: 50 to 60% $P_2O_5$, O to 5% $SiO_2$, 20 to 33% $Li_2O$, 0 to 25% $Na_2O$, 1 to 25% $K_2O$, 0 to 5% for each of CaO, Bao, SrO and MgO, 7 to 10% $Al_2O_3$, 3 to 6% CuO, 0.5 to 1.6% $Cr_2O_3$, 0.5 to 2.0% $Ho_2O_3$, 0.5 to 2.0 $Dy_2O_3$ and 0 to 2.0% $Er_2O_3$.

7 Claims, 1 Drawing Sheet

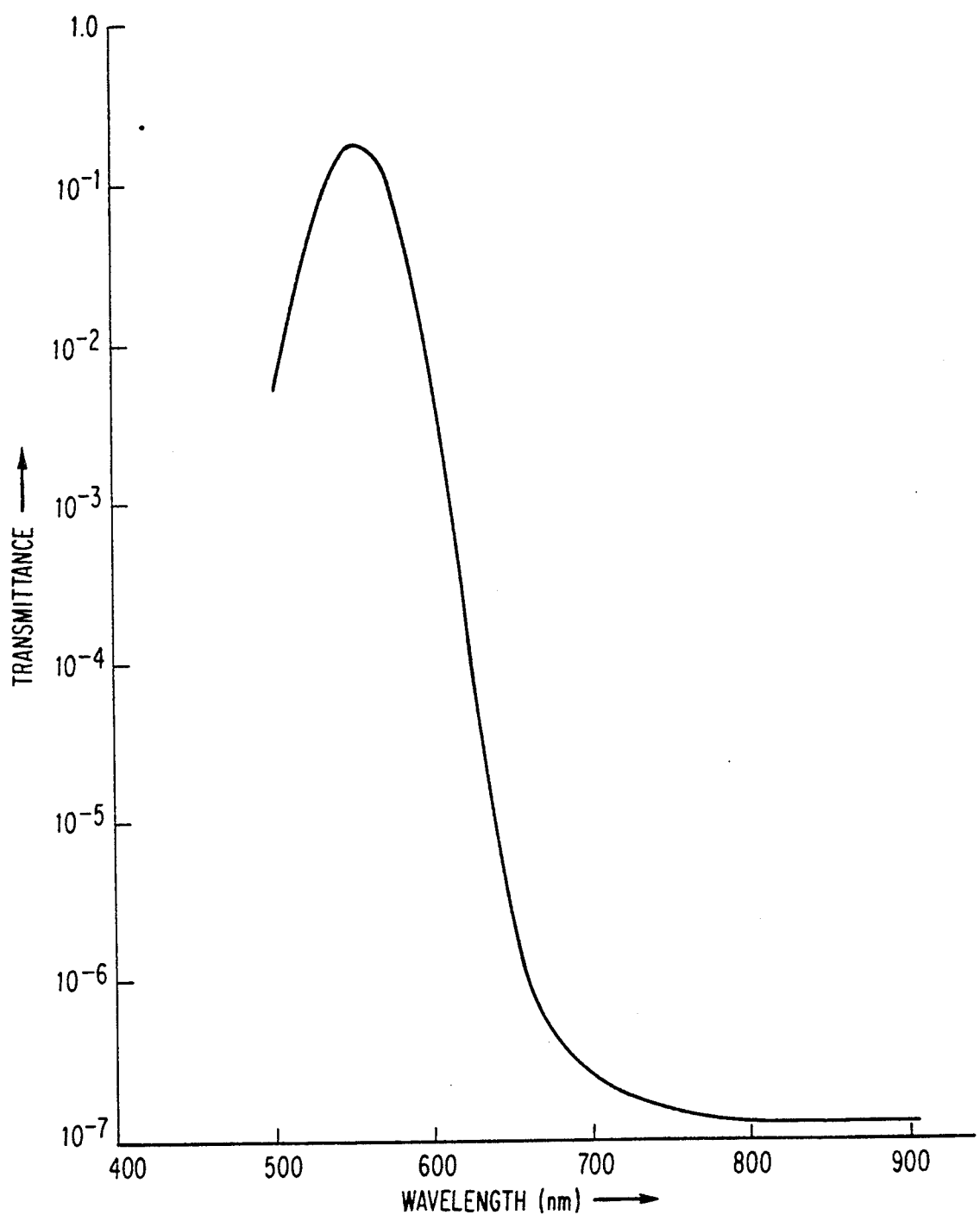

INFRARED ABSORBING GREEN GLASS

BACKGROUND OF THE INVENTION

1. Field of the Invention

The present invention relates to a green optical filter phosphate-based glass having a strong near infrared absorption and a high transmittance around the peak of about 555 nm and with the steepest slope of the absorption curve occurring between about 570 nm to 650 nm.

2. Description of the Prior Art

In order to obtain a green optical display filter that is compatible with night vision imaging systems, the filter must have a strong near infrared absorption to prevent the display lighting from interfering with the operation of night vision goggles which is quite sensitive to near infrared radiation. This type of display filter is required to have a transmittance of less than $10^{-6}$ for near infrared radiation of 700 nm to 950 nm and less than $5 \times 10^{-6}$ at 650 nm to 700 nm. At the same time, it should have a transmission peak for green radiation of 550 nm to 565 nm.

One conventional approach to achieving these requirements involves costly and laborious arrangements of cementing a polished infrared suppressive glass filter onto another polished color correction glass filter. However these two glasses must be selected so as to have similar if not identical thermal expansion properties in order for the cement to continue to hold the glasses together through temperature and weather variations. The additional color correction layer will also cause further inconvenience when the display demands a thin window filter.

The use of alkali metal or alkaline earth metal phosphate glass used as host glass for colored optical filters has also been proposed wherein the phosphate glasses contain CuO as a coloring agent, e.g. see U.S. Pat. Nos. 4,303,298, 4,110,245 and 4,615,989 in this regard.

SUMMARY OF THE INVENTION

Accordingly an object of the present invention is to provide filter phosphate-based glass suitable for use with night vision image system displays having a high near infrared absorption at about 650 nm to 950 nm and a transmission peak at 550 nm to 565 nm. The narrow wavelength difference between the transmission peak and beginning of near infrared absorption at 650 nm also indicates a requirement of a steep slope of the absorption curve occurring between about 570 nm and 650 nm.

Another object of the present invention is to use $Cr_2O_3$ and CuO as co-dopant coloring agents in the glass in order to attain the chromatic and optical properties sought.

It has been discovered that the above object and requirements can be fulfilled with glasses having the following compositions (in mol % of the glass composition):

| | | | |
|---|---|---|---|
| 50-60% $P_2O_5$, | 0-5% $SiO_2$, | 20-33% $Li_2O$, | |
| 0-25% $Na_2O$, | 1-25% $K_2O$, | 0-5% $R_2O$, | |
| 7-10% $Al_2O_3$, | 3-6% CuO, | 0.5-1.6% $Cr_2O_3$, | |
| 0.5-2.0% $Ho_2O_3$, | 0.5-2.0% $Dy_2O_3$, | 0-2.0% $Er_2O_3$, | |

$R_2O$ represents any of MgO, CaO, SrO and BaO.

A preferred glass composition for obtaining the above object and requirements is as follows (in mol % of the glass composition):

| | | | |
|---|---|---|---|
| 57.0% $P_2O_5$, | 7.7% $Al_2O_3$, | 24.9% $Li_2O$, | 1.6% $K_2O$ |
| 5.1% CuO, | 1.6% $Cr_2O_3$, | 1.0% $Ho_2O_3$ | 1.1% $Dy_2O_3$ |

BRIEF DESCRIPTION OF THE DRAWING

The FIGURE is a graph showing the transmission curve of a 2 mm thick glass sample of the following glass composition (in mol %).

| | | | |
|---|---|---|---|
| 57.0% $P_2O_5$, | 7.7% $Al_2O_3$, | 24.9% $Li_2O$, | 1.6% $K_2O$ |
| 5.1% CuO, | 1.6% $Cr_2O_3$, | 1.0% $Ho_2O_3$ | 1.1% $Dy_2O_3$ |

DETAILED DESCRIPTION OF THE INVENTION

As a result of extensive investigations on the relationships between the type and content of various glass additives and their respective influence on the optical, chromatic as well as rheological properties of the glass material, the present inventors have discovered a novel glass composition, described in greater detail hereinafter, which possesses the aforementioned absorption and transmittance characteristics sought.

In the compositional investigations each experimental melt was made with 90 to 100 grams of glass. The thoroughly mixed batch material was melted in a platinum crucible of 120 ml capacity for about 90 minutes followed by a few minutes mechanical stirring and a refining period of about 20 minutes. Melting temperature ranged from 1140° to 1200° C. Higher temperatures of 1180° C. to 1200° C. were required for melting glasses with higher $Al_2O_3$ or $SiO_2$ content.

Evaluation of optical absorption for the test melt glasses was made by determining the optical absorption coefficient of the glass in the spectral range of 500 nm to 900 nm. Since most of the experimental glasses have very high near infrared absorption, samples prepared for this evaluation were made with thickness of 0.5 mm or less.

Variation of the type or content thereof of any component of the aforesaid composition can influence glass character. The influential effect and any content limitations of each component have been investigated and are summarized hereinafter.

A higher concentration of $P_2O_5$ causes larger amounts of weight loss during the melting process because of the high volatility of $P_2O_5$. Further, $P_2O_5$ causes higher viscosity and lower stability against devitrification of the melt. When the content of $P_2O_5$ exceeds 60 mol %, it becomes very difficult to obtain good quality glass with sufficient coloring dopants included in the composition.

On the other hand, lowering of the $P_2O_5$ concentration tends to reduce glass transition temperature which also decreases glass stability against devitrification. Another detrimental effect of lowering $P_2O_5$ concentration is the increase of the linear thermal expansion coefficient of the glass.

These effects are demonstrated by the following results, wherein Tg represents glass transition temperature and $\alpha$ represents the linear thermal expansion coefficient (200°-300° C.).

| Composition (in mol %) | | | | Tg (°C.) | $\alpha$ (200–300° C.) $(10^{-7}/°C.)$ | Glass Quality |
|---|---|---|---|---|---|---|
| $Al_2O_3$ | Dopants + other oxides* | $Li_2O$ | $P_2O_5$ | | | |
| 8.2 | 10.4 | 37.0 | 44.4 | 401 | 130 | particle inclusions |
| 8.2 | 10.4 | 32.1 | 49.3 | 411 | 123 | good |
| 8.2 | 10.4 | 27.2 | 54.2 | 420 | 115 | good |
| 7.7 | 10.4 | 24.9 | 57.0 | 423 | 112 | good |
| 8.2 | 10.4 | 22.3 | 59.1 | 431 | 107 | particle inclusions |
| 8.2 | 10.4 | 17.4 | 64.0 | | | devitrified |

*Other oxides and dopants includes 1.6% $K_2O$, 5.1% CuO 1.6% $Cr_2O_3$, 1% $Ho_2O_3$ and 1.1% $Dy_2O_3$.

Based on these observed effects of $P_2O_5$ concentration, the preferred concentration for this component has been determined to be 50–60 mol % for this invention.

The amount of $SiO_2$ allowed in this present glass composition is less than 5 mol %. Higher silica content is beneficial for the glass insofar as lowering its linear thermal expansion coefficient and improving chemical resistance. However, the high content of $SiO_2$ tends to cause some coloring dopant crystal formation in this glass. Results tabulated hereinafter show these effects.

| Composition (in mol %) | | | | Tg (°C.) | $\alpha$ (200–300° C.) $(10^{-7}/°C.)$ | Glass Quality |
|---|---|---|---|---|---|---|
| $Al_2O_3$ + Dopants* | $Li_2O$ | $P_2O_5$ | $SiO_2$ | | | |
| 18.6 | 32.1 | 49.3 | 0.0 | 411 | 123 | Good |
| 18.6 | 27.2 | 49.3 | 4.9 | 420 | 114 | Good |
| 18.6 | 22.3 | 54.2 | 4.9 | 430 | 107 | Good |
| 18.6 | 17.4 | 59.1 | 4.9 | 437 | 98 | Particle Inclusions |
| 18.6 | 22.3 | 49.3 | 9.8 | 438 | 98 | Particle Inclusions |
| 18.6 | 17.4 | 54.2 | 9.8 | 458 | 99 | Particle Inclusions |
| 18.6 | 17.4 | 49.3 | 14.7 | 452 | 99 | Particle Inclusions |

*$Al_2O_3$ plus dopants include 8.2% $Al_2O_3$, 1.6% $K_2O$, 5.1% CuO, 1.6% $Cr_2O_3$, 1% $Ho_2O_3$, 1% $Dy_2O_3$.

Another effect of $SiO_2$ content in this glass is the reduction of optical absorption between 550 nm–900 nm. The magnitude of reduction is very small as $SiO_2$ concentration is varied in the range of 0–5 mol %. The evaluated optical absorption coefficient reduction is very close to our instrumental error limits and tolerance.

Therefore, for purposes of this present invention, the optimal concentration of $SiO_2$ is determined to be in the range of 0–5 mol %.

The influential effect and content limitation of $Li_2O$ in the present glass have been investigated in a range of 17.4 mol % to 37.0 mol %. All of the test melt glasses with 17.4 mol % of $Li_2O$ have been found to contain particle inclusions. There is a general indication that higher $Li_2O$ content causes a better dissolution of coloring dopants. But there are some detrimental effects for high $Li_2O$ concentration in this glass. It reduces both chemical resistance and thermal stability against devitrification. Glasses melted with 37.0 mol % of this component have been found to have high inclusion density and slight devitrification. $Li_2O$ also increases the linear thermal expansion coefficient of this glass. Results in the following table show this trend.

| Composition (in mol %) | | | | $\alpha$ (200–300° C.) $(10^{-7}/°C.)$ |
|---|---|---|---|---|
| Dopants* | $Al_2O_3$ | $P_2O_5$ | $SiO_2$ | $Li_2O$ | |
| 10.4 | 8.2 | 54.2 | 4.9 | 22.3 | 107 |
| 10.4 | 8.2 | 49.3 | 4.9 | 27.2 | 112 |
| 10.4 | 7.7 | 57.0 | 0 | 24.9 | 114 |
| 10.4 | 8.2 | 54.2 | 0 | 27.2 | 115 |
| 10.4 | 8.2 | 49.3 | 0 | 32.1 | 123 |

*Dopants include 1.6% $K_2O$, 5.1% CuO, 1.6% $Cr_2O_3$, 1% $Ho_2O_3$, and 1% $Dy_2O_3$.

Another general trend that is associated with increasing $Li_2O$ content is related to optical absorption of this glass. Increase of $Li_2O$ content improves optical absorption of the glass. Absorption coefficients of several selected wavelengths for certain test melt glasses are tabulated below to demonstrate this trend.

| Glass No. | Composition (mol %)** | | | |
|---|---|---|---|---|
| | $Al_2O_3$ | $SiO_2$ | $P_2O_5$ | $Li_2O$ |
| A | 8.2 | 0 | 49.3 | 32.1 |
| B | 8.2 | 0 | 54.2 | 27.2 |
| C | 7.7 | 0 | 57.0 | 24.9 |
| D | 8.2 | 0 | 49.3 | 32.1 |
| E | 8.2 | 4.9 | 49.3 | 27.2 |
| F | 8.2 | 4.9 | 54.2 | 22.3 |

**Other components include 1.6% $K_2O$, 5.1% CuO, 1.6% $Cr_2O_3$, 1% $Ho_2O_3$, 1% $Dy_2O_3$.

Absorption Coefficient (1/cm) at the following wavelengths:

| Glass No. | 554 nm | 575 nm | 600 nm | 650 nm | 700 nm | 750 nm | 800 nm |
|---|---|---|---|---|---|---|---|
| A | 9.07 | 15.2 | 30.9 | 69 | 85 | 87 | 93 |
| B | 8.21 | 12.4 | 25.7 | 62 | 77 | 76 | 81 |
| C | 7.49 | 11.7 | 24.5 | 61 | 73 | 72 | 79 |
| D | 9.07 | 15.2 | 30.9 | 69 | 85 | 87 | 93 |
| E | 8.96 | 13.9 | 27.5 | 67 | 83 | 83 | 89 |
| F | 8.11 | 12.0 | 24.9 | 61 | 77 | 75 | 79 |

The increase of optical absorption due to higher $Li_2O$ concentration involves the whole spectrum of 550 nm to 900 nm. Since the purpose of this invention is to develop a glass with strong near infrared absorption and good transmission for 550 nm to 560 nm radiation, the overall increase of optical absorption is not necessarily a benefit. However, the $Li_2O$ concentration does provide a useful parameter for optical absorption adjustment.

The appropriate concentration of $Li_2O$ component in the glass of the present invention is determined to be 20 to 33 mol %.

Replacement of $Li_2O$ by either $Na_2O$ or $K_2O$ affects a change in the $Cu^{2+}$ ion's absorption behavior, especially for the radiation spectral region of 550 nm to 700 nm. The transmission curve of this region tends to be shifted to the longer wavelength. This red shift effect reduces optical absorption between these two wavelengths. However the glass absorption for the radiation of 750 nm to 900 nm peak area is substantially increased. Therefore, the replacement of $Li_2O$ by $Na_2O$ or $K_2O$ might still be applicable and is within the scope of the present invention.

The total amount of alkali metal oxides preferable for the glass compositions of the present invention is found to be less than 33 mol % with the $Li_2O$ mol % being greater than the sum of other alkali metal oxides.

Application of alkaline earth oxides in this glass has been found to reduce the solubility of coloring dopants. When more than 5 mol % for any one of MgO, CaO, or SrO was included, particle inclusions were observed.

The mol % concentration of $Al_2O_3$ in this present glass is preferred to be in the range of 7.0 to 9.0. Higher content of this component tends to reduce thermal expansion coefficient. However, when the $Al_2O_3$ concentration exceeds 9 mol %, the high melt viscosity and high liquidus temperature of the glass make casting more difficult. Glass melted with 10 mol % of $Al_2O_3$ and sufficient coloring dopants has been found to have some particle inclusion inside. The following results show this trend.

| Composition** (mol %) | | | $\alpha$ (200–300° C.) | |
|---|---|---|---|---|
| $P_2O_5$ | $Li_2O$ | $Al_2O_3$ | $(10^{-7}/°C.)$ | Glass Quality |
| 57.5 | 25.2 | 6.6 | 117 | Good |
| 57.0 | 24.9 | 7.7 | 112 | Good |
| 56.2 | 24.5 | 8.8 | 113 | Good |
| 55.4 | 24.2 | 9.9 | 109 | Particle Inclusions |

**Other components include 1.6% $K_2O$, 5.1% CuO, 1.6% $Cr_2O_3$, 1% $Ho_2O_3$, 1% $Dy_2O_3$.

Coloring dopants selected for the present invention include CuO and $Cr_2O_3$ used in combination as the primary coloring dopants, and $Ho_2O_3$, $Er_2O_3$, and $Dy_2O$ as supplemental dopants. $Cu^{+2}$ ions in phosphate glass have a broad and strong absorption band ranged from about 500 nm to 2000 nm with peak located at about 800 nm. $Cr^{3+}$ ions have absorption peaks at about 450 nm and 650 nm with transmission peak at about 550 nm. $Cr_2O_3$ creates the green coloration for this glass. $Cr_2O_3$ gives an absorption peak at 650 nm which will improve the capability of optical absorption between 650 nm and 900 nm. This compound also increases the steepness of the absorption curve between 570 nm and 700 nm.

$Ho^{3+}$ and $Dy^{3+}$ ions have small absorption bands at about 650 nm and 800 nm respectively. $Er^{3+}$ ions have absorption peaks at both 650 nm and 800 nm. Therefore, the addition of these rare earth oxides can be useful. The absorption of $Ho^{3+}$ at 650 nm is important for this present invention because of its improvement to the sharpness of the absorption curve.

Molar extinction coefficients of these rare earth ions, i.e.. $Ho^{3+}$, $Er^{3+}$, $Dy^{3+}$, for near infrared radiation wavelengths are substantially smaller than $Cu^{2+}$ and $Cr^{3+}$ ions. In this present invention. CuO and $Cr_2O_3$ are considered as primary coloring dopants. $Ho_2O_3$, $Dy_2O_3$ and optionally $Er_2O_3$ are considered as necessary secondary or supplemental dopants since dissolution limits exists for CuO and $Cr_2O_3$ in the practice of the present invention.

If CuO dopant is solely used as coloring agent in this glass, its concentration could be increased up to about 11 mol % without any devitrification in the glass. However, when the multiplicity of coloring dopants mentioned in the previous paragraph are used in combination the maximum concentration for the CuO dopant is reduced to about 6 mol %. Further increase of the CuO concentration causes particle inclusions in the glass.

The dissolution limit of $Cr_2O_3$ in the glass of the present invention is even more stringent than that for CuO. The maximum concentration limit for $Cr_2O_3$, as co-doped or even if used as a sole dopant, is found to be about 1.6 mol %. When the content of this dopant was increased to 2 mol %. devitrification of the glass occurred.

The preferred concentration of the secondary coloring dopants of $Ho_2O_3$ and $Dy_2O_3$ has been found to be about 1.0 mol % each. $Ho^{+3}$ ions have a weak absorption band stretching from 530 nm to 553 nm. Should the high transmission at 555 nm become very critical, reductions of $Ho_2O_3$ concentration might be necessary. $Er^{3+}$ ions have overlapping absorption bands stretched from about 500 nm to 560 nm which causes the application of $Er_2O_3$ in this glass to become more restricted. Therefore, the $Er_2O_3$ dopant is suitable only when the required transmission peak is located at wavelengths of 560 nm or greater.

While the invention has been described in detail and with reference to specific embodiments thereof, it will be apparent to one skilled in the art that various changes and modifications can be made therein without departing from the spirit or scope thereof.

What is claimed is:

1. A phosphate-based green filter glass with strong absorption in the spectral range of 650 nm to 950 nm, consisting essentially of the following ingredients, in mol %:
    (i) 50 to 60% $P_2O_5$
    (ii) 0 to 5% $SiO_2$
    (iii) 20 to 33% $Li_2O$, 0 to 25% $Na_2O$, 1 to 25% $K_2O$
    (iv) 0 to 5% MgO, 0 to 5% CaO, 0 to 5% BaO, 0 to 5% SrO
    (v) 7 to 10% $Al_2O_3$
    (vi) 3 to 6% CuO
    (vii) 0.5 to 1.6% $Cr_2O_3$
    (viii) 0.5 to 2.0% $Ho_2O_3$
    (ix) 0.5 to 2.0% $Dy_2O_3$
    (x) 0 to 2.0% $Er_2O_3$.

2. The phosphate-based filter glass composition as in claim 1, wherein the total mol % of monovalent oxides is 20 to 33 mol %.

3. The phosphate-based filter glass composition as in claim 1, wherein the ratio of $Cr_2O_3$ mol % to CuO mol % is between 0.25 to 0.80.

4. A green filter glass consisting essentially of the following ingredients, in mol %: 57.0% $P_2O_5$, 24.9% $Li_2O$, 1.6% $K_2O$, 7.7% $AL_2O_3$, 5.1% CuO, 1.6% $Cr_2O_3$, 1.0% $Ho_2O_3$, 1.1% $Dy_2O_3$.

5. A green filter glass consisting essentially of the following ingredients, in mol %: 54.2% $P_2O_5$, 4.9% $SiO_2$, 22.3% $Li_2O$, 1.6% $K_2O$, 8.2% $Al_2O_3$, 5.1% CuO, 1.6% $Cr_2O_3$, 1% $Ho_2O_3$, 1.1% $Dy_2O_3$.

6. A green filter glass consisting essentially of the following ingredients, in mol %: 54.2% $P_2O_5$, 4.9% $SiO_2$, 22.3% $Li_2O$, 1.6% $K_2O$, 8.2% $Al_2O_3$, 5.1% CuO, 1.6% $Cr_2O_3$, 2.1% $Ho_2O_3$.

7. A phosphate-based green filter glass as in claim 1, wherein said glass has a transmission peak at 550 nm to 560 nm and with the steepest slope of the absorption curve occurring between 570 nm and 650 nm.

* * * * *